(12) United States Patent
Saar

(10) Patent No.: US 10,140,200 B2
(45) Date of Patent: Nov. 27, 2018

(54) DATA ANALYSIS

(71) Applicant: KING.COM LIMITED, St. Julians (MT)

(72) Inventor: William Saar, Stockholm (SE)

(73) Assignee: KING.DOM LTD., St. Julians (MT)

( * ) Notice: Subject to any disclaimer, the term of this patent is extended or adjusted under 35 U.S.C. 154(b) by 316 days.

(21) Appl. No.: 14/883,973

(22) Filed: Oct. 15, 2015

(65) Prior Publication Data

US 2017/0109382 A1 Apr. 20, 2017

(51) Int. Cl.
*G06F 17/30* (2006.01)
*G06F 11/34* (2006.01)

(52) U.S. Cl.
CPC ...... *G06F 11/3466* (2013.01); *G06F 17/3033* (2013.01); *G06F 17/30315* (2013.01); *G06F 17/30675* (2013.01)

(58) Field of Classification Search
CPC .......... G06F 17/30315; G06F 17/3033; G06F 17/30675; G06F 11/3466
USPC ....................................................... 707/722
See application file for complete search history.

(56) References Cited

U.S. PATENT DOCUMENTS

| | | | | |
|---|---|---|---|---|
| 6,317,787 B1 * | 11/2001 | Boyd | ................... | G06F 11/3476 709/224 |
| 7,925,678 B2 * | 4/2011 | Botros | .............. | G06F 17/30991 707/803 |
| 9,342,621 B1 * | 5/2016 | Raphel | .............. | G06F 17/30949 |
| 2007/0067289 A1 * | 3/2007 | Novak | ................. | G06F 17/2775 |
| 2009/0089252 A1 * | 4/2009 | Galitsky | ........... | G06F 17/30637 |
| 2009/0182728 A1 * | 7/2009 | Anderson | .......... | G06F 17/30522 |
| 2010/0174716 A1 * | 7/2010 | Elbaz | .................... | G06F 17/277 707/737 |
| 2011/0191373 A1 * | 8/2011 | Botros | .............. | G06F 17/30991 707/776 |
| 2014/0025369 A1 * | 1/2014 | Fuchs | ................. | G06F 17/2775 704/9 |
| 2016/0378780 A1 * | 12/2016 | Jerrard-Dunne | ........................... | G06F 17/30156 707/672 |

OTHER PUBLICATIONS

Vaarandi, Risto, "A Data Clustering Algorithm for Mining Patterns From Event Logs", IPOM 2003, Kansas City, MO, Oct. 3, 2003, IEEE, pp. 119-126.*

* cited by examiner

*Primary Examiner* — Robert Stevens
(74) *Attorney, Agent, or Firm* — Saul Ewing Arnstein & Lehr LLP

(57) ABSTRACT

A method for determining one or more anomalies associated with a first set of data, said method comprising: processing said first set of data to provide frequency information for a plurality of combinations of data in said first set of data; comparing said frequency information for the first set of data with frequency information for said combinations of data in a reference set of data; and in dependence on said comparison determining one or more anomalies.

16 Claims, 16 Drawing Sheets

| Phrase | Reference interval count | Examination interval count | Difference | Anomaly? |
|---|---|---|---|---|
| A, B, C, D | 1 | 1 | 0 | |
| A, B, C | 2 | 3 | 1 | ▶ |
| A, B | 2 | 55 | 53 | ▶ |
| B, C | 2 | 2 | 0 | |
| C, D | 3 | 5 | 2 | ▶ |
| A | 6 | 12 | 6 | ▶ |
| B | 6 | 63 | 57 | ▶ |
| C | 5 | 8 | 3 | ▶ |
| D | 5 | 8 | 3 | ▶ |

Figure 5

| Date | Time | User I.D | Event |
|---|---|---|---|
| 22/06/2015 | 10:38 a.m. | User 76 | Initiate game |
| 22/06/2015 | 10:38 a.m. | User 3452 | Purchase 10 credits |
| 22/06/2015 | 10:39 a.m. | User 841 | End game |
| 22/06/2015 | 10:39 a.m. | User 24601 | Complete level |
| 22/06/2015 | 10:39 a.m. | User 7045 | Sign-out |
| 22/06/2015 | 10:40 a.m. | User 463 | Game initiation failure |

| Phrase | Reference interval count | Examination interval count | Difference |
|---|---|---|---|
| A, B, C, D | 1 | 1 | 0 |
| A, B, C | 2 | 3 | 1 |
| A, B | 2 | 55 | 53 |
| B, C | 2 | 2 | 0 |
| C, D | 3 | 5 | 2 |
| A | 6 | 12 | 6 |
| B | 6 | 63 | 57 |
| C | 5 | 8 | 3 |
| D | 5 | 8 | 3 |

Figure 9

| Phrase | Reference interval count | Examination interval count | Difference | Anomaly? |
|---|---|---|---|---|
| A, B, C, D | 1 | 1 | 0 | |
| A, B, C | 2 | 3 | 1 | ▲ |
| A, B | 2 | 55 | 53 | ▲ |
| B, C | 2 | 2 | 0 | |
| C, D | 3 | 5 | 2 | ▲ |
| A | 6 | 12 | 6 | ▲ |
| B | 6 | 63 | 57 | ▲ |
| C | 5 | 8 | 3 | ▲ |
| D | 5 | 8 | 3 | ▲ |

Figure 14

| Row | Date | Time | User I.D | Event |
|---|---|---|---|---|
| 1 | 23/06/2015 | 10:49 a.m. | User 832 | Connection refused to database 4 |
| 2 | 23/06/2015 | 10:49 a.m. | User 97 | Game ended |
| 3 | 23/06/2015 | 10:49 a.m. | User 7036 | Connection to database 17 allowed |
| 4 | 23/06/2015 | 10:50 a.m. | User 8364 | Sign-out |
| 5 | 23/06/2015 | 10:52 a.m. | User 1026 | 10 credits purchased |
| 6 | 23/06/2015 | 10:52 a.m. | User 2985 | Connection refused to databse 85 |
| n | ... | ... | ... | ... |

DATA ANALYSIS

BACKGROUND OF THE INVENTION

Embodiments of the present application relate to the storage of data and analysis of stored data. More particularly embodiments of the present application relate to the storage of data in log-files, and the analysis of data stored in log-files.

In computing, a log-file is a file that lists events that have occurred. For example, a server such as a web server may maintain a log file that lists every request made to the server. A log-file can be useful as it enables performance information to be analysed by an administrator of the server. For example it may enable an administrator of the server to determine whether there are any bugs or anomalies occurring.

A server may have to deal with very large amounts of information. Depending on the context of use, a server may have to deal with thousands, hundreds of thousands, or even millions of events a day. For example a server which hosts an online gaming community may have to deal with many events involving players playing the online game. It would be highly impractical for the data to be manually analysed to detect any anomalies occurring. Therefore the data needs to be analysed in an automated manner. To reduce processing and memory requirements and /or loads on the server, embodiments of the present application may analyse this data in a resource-efficient manner, as explained below.

SUMMARY OF THE INVENTION

According to an aspect, there is provided a computer implemented method for determining one or more anomalies associated with a first set of data, said method comprising: processing said first set of data to provide frequency information for a plurality of combinations of data in said first set of data; comparing said frequency information for the first set of data with frequency information for said combinations of data in a reference set of data; and in dependence on said comparison determining one or more anomalies.

At least one of said combinations of data comprises a data string of length n, where n is an integer greater than one.

Providing frequency information for a respective combination of data may comprise recording a respective occurrence of said particular combination of data.

Recording a respective occurrence may comprise recording count information associated with said occurrence.

Recording a respective occurrence of said respective combination of data comprises providing position information indicating a position of a respective occurrence of respective combination of data.

A plurality of combinations of data may be stored as separate entries in a first table field of a table, the table comprising a second field for recording respective position information associated with the respective plurality of combinations of data.

According to some embodiments, a particular combination of data is stored as an entry in a first field of a table, and each instance of said particular combination of data is stored as a series of position identifiers in a corresponding second field in the table.

According to some embodiments, said frequency information is generated by determining a number of position identifiers associated with said particular combination of data in the first set of data.

Further information associated with an anomaly in the first set of data may be determined based on said position information.

The method may comprise providing a least one subset of at least one combination of data of said plurality of combinations of data to provide a further combination of data, and processing said further combination of data to provide respective frequency information.

According to some embodiments, at least one of said combinations of data comprise one or more subsets of consecutive data of one or more combinations of data.

The method may comprise for a given combination of data, determining if said given combination of data is recorded and if not, processing said given combination to provide at least one further combination of data, the or each further combination of data being a subset of said given combination of data and determining if the or each further combination of data is recorded.

The method may comprise, if said given combination of data is not recorded, recording said given combination of data.

The method may comprise for a given combination of data, determining if said given combination of data is recorded and if so, providing associated frequency information and selecting another combination of data to determine if said another combination of data is recorded.

According to some embodiments, said sub-set of data comprises a data string comprising a sub-set of consecutive characters of the particular combination of data from which the sub-set of data has been obtained.

According to some embodiments, said sub-set of data comprises a data string of length n-m of said particular combination of data from which the sub-set of data has been obtained, where m is an integer greater than or equal to one but less than n.

According to some embodiments, the particular combination of data is modified to provide the sub-set of data in dependence on frequency information for the particular combination of data in the first set of data.

According to some embodiments, the particular combination of data is modified to provide the sub-set of data when it is determined that frequency information for the particular combination of data in the first set of data is zero or one.

An anomaly may identified when it is detected that the frequency information in the first set of data differs from the frequency information in the reference set of data.

According to some embodiments an anomaly is identified when the frequency information in the first set of data differs by more than a threshold amount from the frequency information for the reference set of data.

At least one of the first and second sets of data may be provided by one or more log files.

The first set of data may be comprised in a first log file and the second set of data is comprised in a second log file.

According to some embodiments, the first set of data comprises a part of a log file and the second set of data comprises a different part of the log file.

The frequency information may be stored in one or more hash tables.

According to another aspect, there is provided an apparatus comprising: at least one memory and at least one processor, the at least one memory and the at least one processor configured to cause the apparatus to: process a first set of data to provide frequency information for a plurality of combinations of data in said first set of data; compare said frequency information for the first set of data with frequency information for said combinations of data in a reference set of data; and in dependence on said comparison, determine one or more anomalies.

At least one of said combinations of data may comprise a data string of length n, where n is an integer greater than one.

The at least one memory and the at least one processor may be configured to cause the apparatus to record a respective occurrence of said particular combination of data.

The at least one memory and the at least one processor may be configured to cause the apparatus to record count information associated with said occurrence.

The at least one memory and the at least one processor may be configured to cause the apparatus to record position information indicating a position of a respective occurrence of respective combination of data.

The at least one memory and the at least one processor may be configured to cause the apparatus to store a plurality of combinations of data as separate entries in a first table field of a table, the table comprising a second field for recording respective position information associated with the respective plurality of combinations of data.

The at least one memory and the at least one processor may be configured to cause the apparatus to determine further information associated with an anomaly in the first set of data based on said position information.

The at least one memory and the at least one processor may be configured to cause the apparatus to provide a least one subset of at least one combination of data of said plurality of combinations of data to provide a further combination of data, and processing said further combination of data to provide respective frequency information.

The at least one memory and the at least one processor may be configured to cause the apparatus to for a given combination of data, determine if said given combination of data is recorded and if not, process said given combination to provide at least one further combination of data, the or each further combination of data being a subset of said given combination of data and determining if the or each further combination of data is recorded.

The at least one memory and the at least one processor may be configured to cause the apparatus to if said given combination of data is not recorded, record said given combination of data.

The at least one memory and the at least one processor may be configured to cause the apparatus to for a given combination of data, determine if said given combination of data is recorded and if so, provide associated frequency information and select another combination of data to determine if said another combination of data is recorded.

The at least one memory and the at least one processor may be configured to cause the apparatus to identify an anomaly when it is detected that the frequency information in the first set of data differs from the frequency information in the reference set of data.

At least one of the first and second set of data may be provided by one or more log files.

The frequency information may be stored in one or more hash tables.

According to another aspect, there is provided a computer program comprising computer executable instructions which when run on one or more processors is configured to provide any of the methods previously described.

According to another aspect there is provided a non-transitory computer readable medium comprising computer executable instructions which when run by at least one processor are configured to determine one or more anomalies associated with a first set of data by: processing said first set of data to provide frequency information for a plurality of combinations of data in said first set of data; comparing said frequency information for the first set of data with frequency information for said combinations of data in a reference set of data; and in dependence on said comparison determining one or more anomalies.

BRIEF DESCRIPTION OF THE DRAWINGS

To understand some embodiments, reference will now be made by way of example only to the accompanying drawings, in which:

FIG. 5 shows an exemplary log-file;

FIG. 8 shows an example hash table, according to an embodiment;

FIG. 9 shows an example hash and anomaly detection table, according to an embodiment;

FIG. 14 shows a log file according to an embodiment; and

DETAILED DESCRIPTION OF SOME EMBODIMENTS

Figure 1:
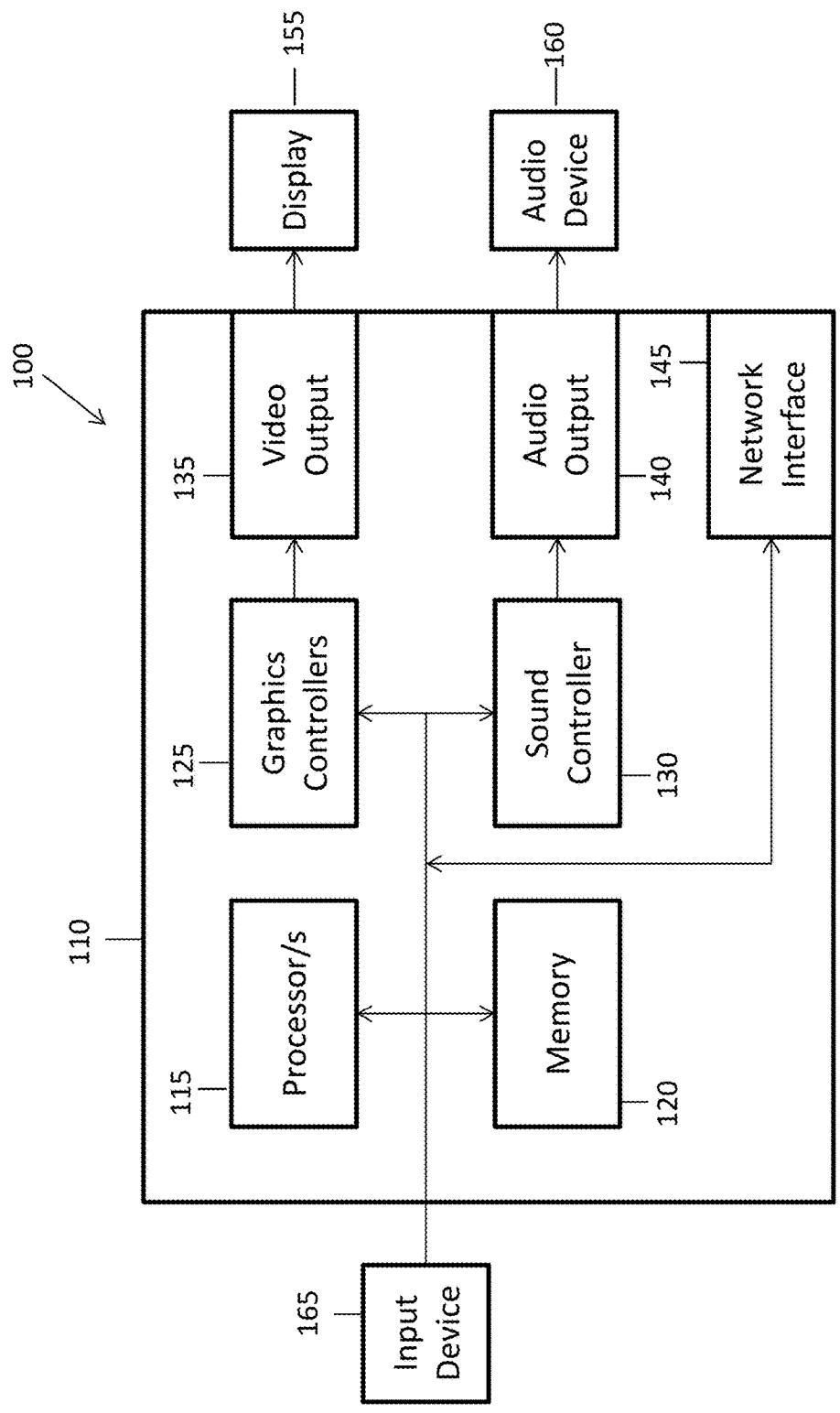
FIG. 1 shows an example computing device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
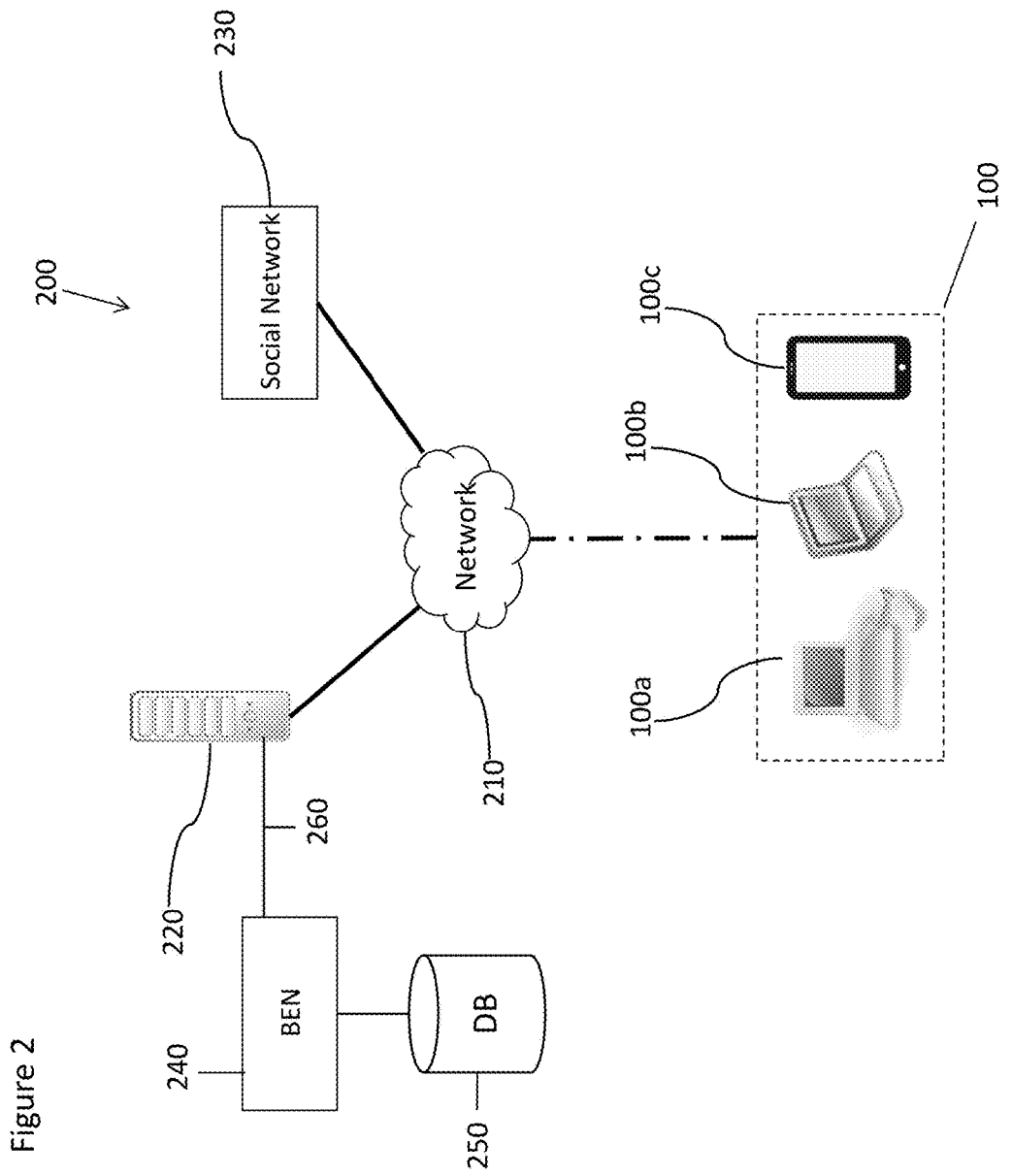
FIG. 2 illustrates an example system in which some embodiments may be provided.

FIG. 2 schematically shows a system 200 in some embodiments. The system 200 comprises a server 220 which may store or be in communication with databases 250 which may be, in some embodiments, connected to a back end infrastructure 240 "BEN") of game player's details, profiles, statistics, etc. In practice, one or more databases 250 may be provided. Where more than one server 220 is provided, the database(s) 250 may be provided in one database 250 or in databases across two or more servers 220, 310. The server 220 may also have a games data function. This may comprise one or more units of memory to store the computer game program and user behaviour data, and a processor to run the games program and process the user behaviour data.

The server 220 may communicate via for instance the Internet 210 to one or more user devices 100, shown in the Figure by way of example as user devices 100a, 100b and 100c, and may further provide connections to a social network 230.

Figure 3:
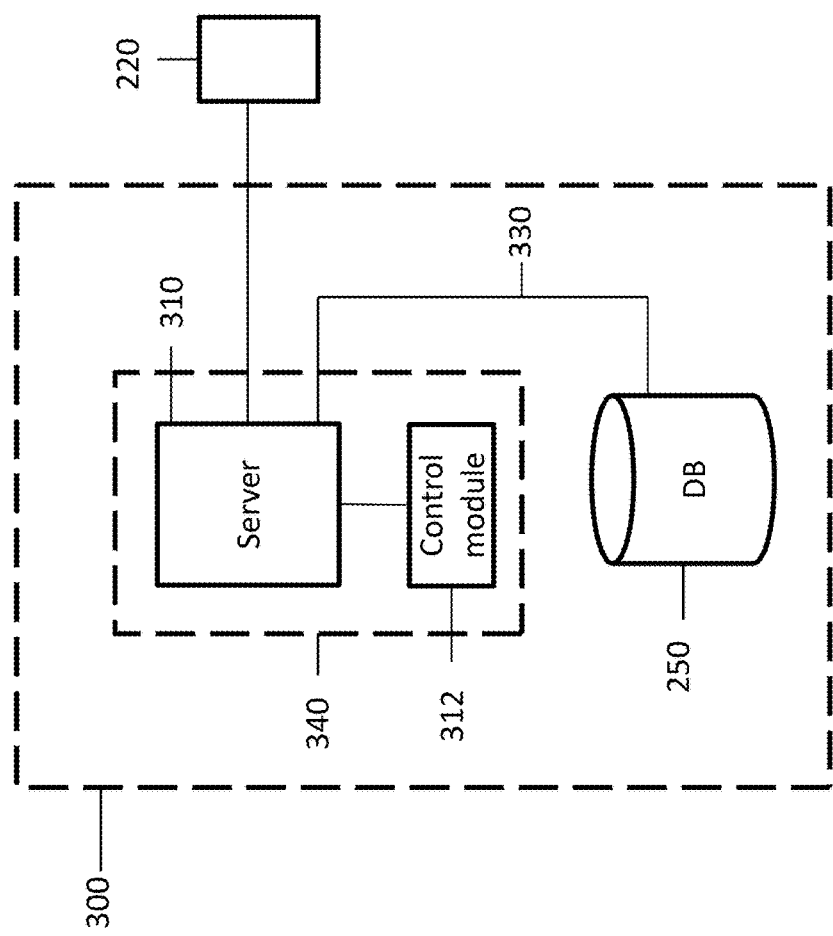
FIG. 3 shows a back-end system according to some embodiments.

FIG. 3 illustrates a back end infrastructure 300 according to an embodiment, comprising a server 310 in communication with or connected to a control module 312. The control module 312 may be implemented as part of server 310, or may be a separate module 312 external to and connected with the server 310. The control module may be comprised of one or more processors and at least one memory. The control module may be provided by computing device. The server 310 may be one of many servers, such as those known to the person skilled in the art as a server farm 340, or rack.

The server 310 or server farm 340 may be connected as shown to server 220, and to database 250 via link 330. Link 330 may be wired, wireless and/or provided via or through networks such as the Internet, as known to those persons skilled in the art. The control module 312 provides control and update of data in the database(s) 250.

Figure 4:
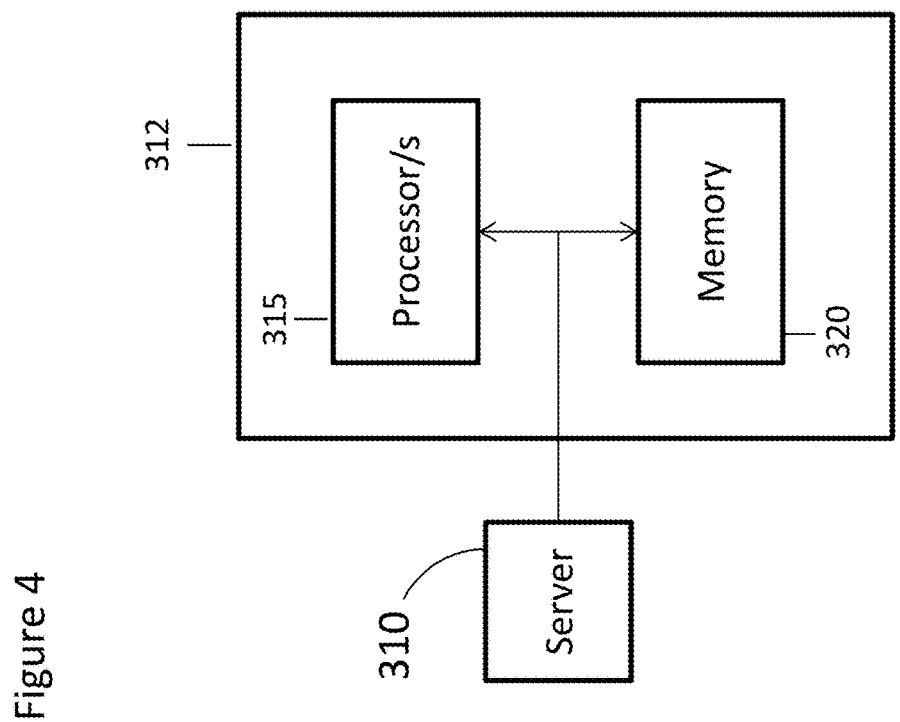
FIG. 4 shows a control module according to an embodiment.

As shown in FIG. 4 the control module 312 comprises at least one processor 315 and at least one memory 320. The at least one processor and the at least one memory can be controlled to carry out a number of computerised tasks. In FIG. 4 the control module is shown as connected to server 310, however as mentioned above the control module 312 may be comprised within server 310.

The memory 320 (and/or one or more further memories) may store one or more log files. An example of a log file is shown in FIG. 5. The log file 400 comprises a "Date" column 402, a "Time" column 404, a "User I.D." column 406 and an "Event" column 408. The log file 400 logs events that occur at the server 310. For example, at 10:38 a.m. on 22Jun. 2015, User 76 initiated a game. At 10:39 a.m. on 22Jun. 2015, User 24601 completed a level etc. The log file can also log errors/failures etc. For example, at 10:40 a.m. on 22Jun. 2015 it has been logged that user 463 has experienced a game initiation failure. It may therefore be considered that the log file comprises a set of data. According to some embodiments the log files are log files on the NCSA Common Log File format. It will be understood however that the methods, apparatus and systems described herein are also applicable to other log file formats or sets of data or pieces of data.

According to some embodiments, a log file showing events that have occurred during an examination interval is compared with a log file showing events that have occurred during a reference interval. In some embodiments the comparison process is initiated in response to a determination that the system is experiencing problems. There may of course be other triggers for performing the comparison process. For example, it may be determined that the system is experiencing an unusually high number of failures. Therefore in response to this determination a log file may be examined over a period of, for example, the preceding 30 minutes. This log file can be compared with a reference log file taken from a period during which the system is considered to have been running normally. In some embodiments the reference log file is selected so as to resemble the system conditions of the examination interval. For example the reference log file may be taken to cover the same time of day as the examination log file, or during a period of similar system loading. According to some embodiments the reference interval and examination interval may comprise different parts of the same log file.

Each entry in the log file may be considered to constitute a "phrase" or combination of data. Each phrase can be considered to constitute one or more further phrases or sub-phrases (or sub-set of data). For example the entry "Game initiation failure" can be considered a phrase, and this phrase includes the sub-phrases "game initiation", "initiation failure", "game", "initiation". That is a phrase can be broken down in to a series of constituent sub-phrases, each sub-phrase comprising one or more elements of the original phrase, such that all possible sub-phrases are captured. This can be continued in a tree-like structure. In some embodiments all possible sub-phrases are captured in the tree. Each phrase or sub-phrase can be simply referred to as a phrase. Similarly, the phrase "Game initiation failure" can be considered a combination of data, in as much as it is a combination of characters in a character or data string. Each character can individually be considered a sub-set of the data. For example the letter "f" (comprised in the word "failure") is a sub-set of the data. Likewise other data strings can be considered as one or more sub-sets. For example the word "Game" is a character or data string which constitutes a combination of data (in this case letters) that is a sub-set of the overall combination of data "Game initiation failure".

Figure 6:
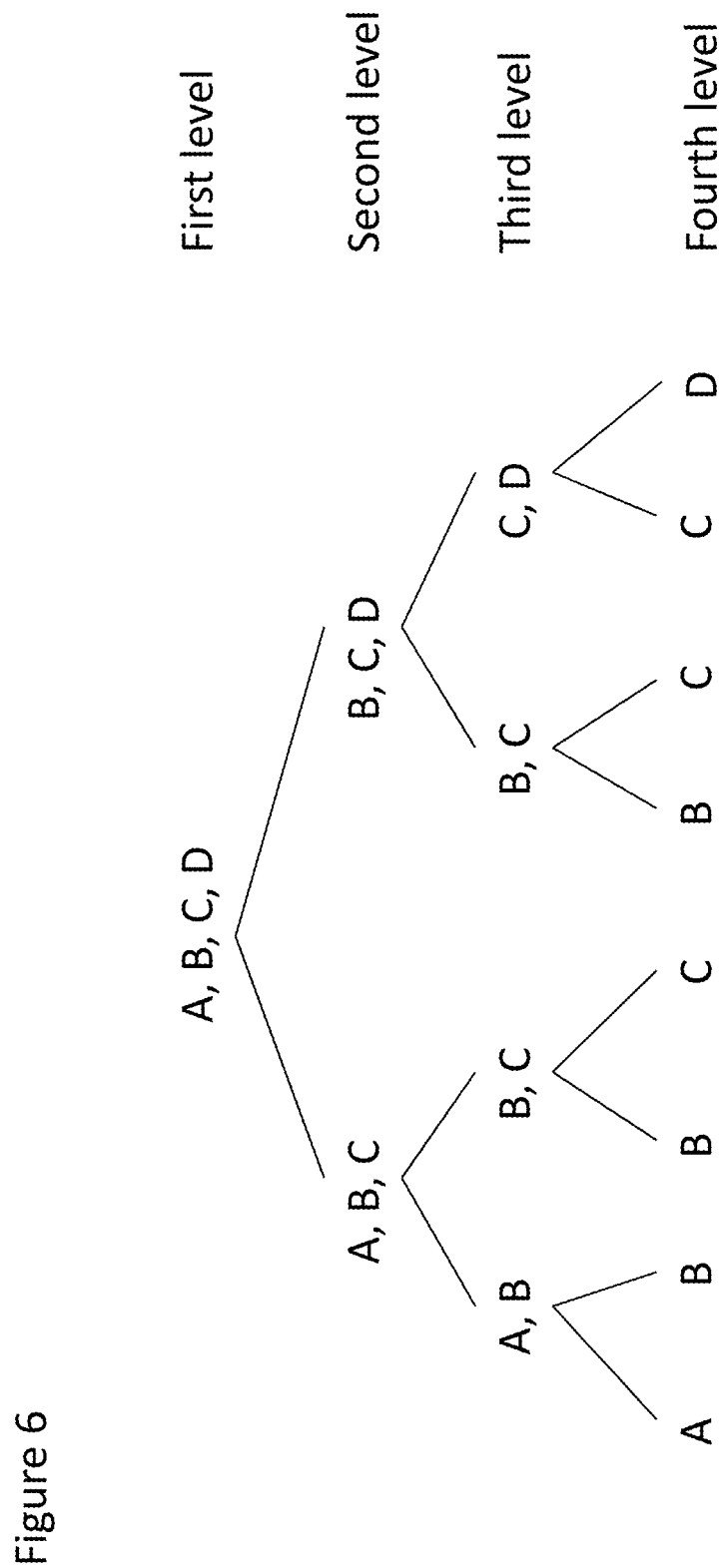
FIG. 6 shows an example of breaking down phrases, according to an embodiment.

This is explained further in FIG. 6, using a hypothetical phrase constituting four characters A, B, C, D as an example. This phrase may be considered to be of length n, where in this example n=4. In at least some embodiments n is an integer greater than 1. In other words the data string comprises at least two or more data components (e.g. two or more characters). As shown, the original phrase A, B, C, D is shown at a first level, and is broken down through second, third and fourth levels until it cannot be broken down any further. The hierarchical tree of FIG. 6 shows all possible phrase strings that can be formed from the phrase A, B, C, D. That is all possible combinations of phrase terms are included in the tree of FIG. 6, so long as the constituent terms were originally adjacent each other in the original phrase. Therefore in some embodiments phrases consisting of non-adjacent/sequential phrase terms from the original phrase are not included in the tree, for example phrases A, B, D and A, C, D etc. Therefore in some embodiments each combination of data (e.g. phrase) of a plurality of combinations of data (phrases) may comprise a subset of consecutive data in a data set (e.g. consecutive or adjacent data elements in a log-file).

Figure 7:
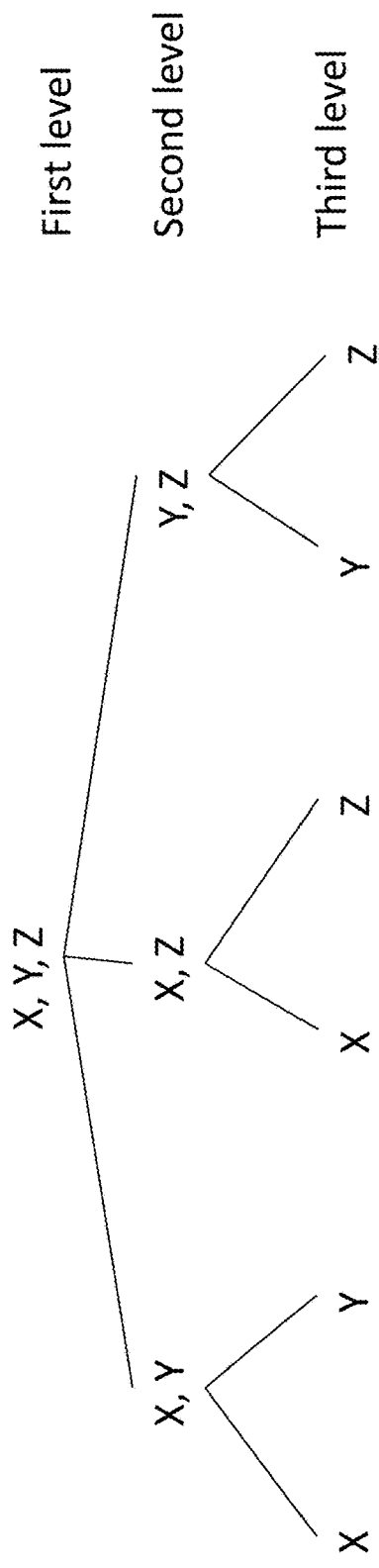
FIG. 7 shows an example of breaking down phrases, according to an embodiment.

In other embodiments all possible phrase and sub-phrase combinations may be included in the tree. This is shown for example in FIG. 7, which shows all sub-phrases stemming from original phrase X, Y, Z. Further embodiments may also enable sub-phrases to be included which are in a reverse order to their order in the original phrase e.g. Z, X and Z, Y.

The sub-phrases may be considered to be of length n-m, where m is an integer greater than or equal to one but less than n. In other words the sub-phrase is shorter than the original or "parent" phrase.

According to embodiments, a count is maintained of phrases that occur in the examination interval and the reference interval. The count may be maintained in the form of a hash table or a look up table (LUT). There may be separate hash tables for the examination interval and the reference interval. That is a first hash table may be used to store a count of the occurrences of terms in the reference interval, and a second hash table may be used to store a count of the occurrences of terms in the examination interval. Then, a comparison can be made for the number of occurrences of particular phrases in the examination and reference intervals. If a particular phrase occurs significantly more often in the examination interval than in the reference interval, then it can be determined that a problem may be associated with that phrase, or an activity or occurrence associated with that phrase.

Figures 7A, 7B:
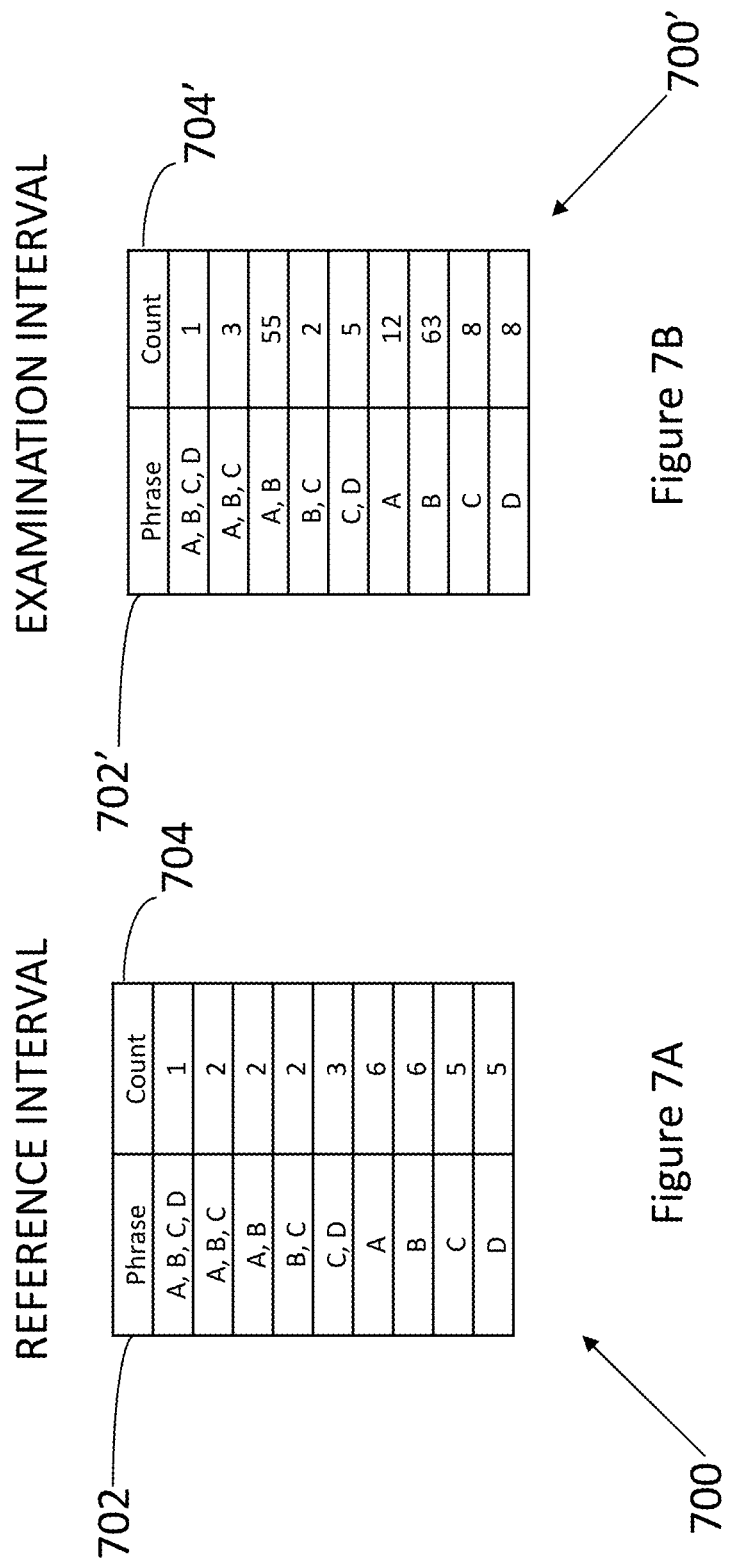
FIGS. 7A and 7B show example hash tables, according to an embodiment.

Example hash tables are shown in FIGS. 7A and 7B. FIG. 7A shows a hash table 700 for a reference interval, comprising phrase column 702 and corresponding count column 704. FIG. 7B shows a hash table 700' for an examination interval, comprising phrase column 702' and corresponding count column 704'. The relative count differences for various phrases can be ascertained from these two tables. For example it can be determined that the count for phrase A, B, C is 2 in the reference interval (FIG. 7A), and 3 in the examination interval (FIG. 7B).

FIG. 8 shows a hash table 800 which combines the hash tables of FIGS. 7A and 7B. The hash table 800 comprises a phrase column 702, a reference interval count column 704, and an examination interval count column 704'. The hash table 800 further comprises a "difference" column 706, which shows the difference in the number of occurrences of the given phrases between the reference and examination intervals. The specific structure of the table of FIGS. 7A, 7B and 8, whilst useful for the purposes of explaining a comparison of the examination interval to the reference interval, may also be embodied in any other way. Ultimately, whatever the structure of the table or tables used, a count of phrases in the examination interval and reference interval can be compared to determine any anomalies.

Turning back to FIG. 8, there are a number of instances where the phrase count differs between the examination interval and the reference interval. For example there is a count difference for phrases A, B, C (row 2); A, B (row 3); C, D (row 5); A (row 6); B (row 7); C (row 8); D (row 9). In some embodiments, a flag is raised for all phrases that have a different count between the reference interval and the examination interval. This is shown for example in FIG. 9, in which a further column 708 is provided for flagging up anomalous phrases.

In some embodiments, phrases are only flagged up as being anomalous if the count difference between the reference interval and the examination interval is above a certain threshold level. The threshold may be a percentage. For example only if the count is 20% or more in the examination interval compared to the reference interval will a flag be raised. This threshold can of course be varied. In other embodiments the threshold level may be based on a count number. For example a flag may only be raised if a count occurs 50 or more times more in the examination interval than in the reference interval. Again, this threshold level can be varied.

Although the example of FIG. 9 shows phrases occurring with the same or a higher frequency in the examination interval than in the reference interval, it will be understood that one or more phrases could occur fewer times in the examination interval than in the reference interval. In such situations the number in the "difference" column will be preceded with a "−" (minus) symbol. The use of flags and thresholds may equally apply to these negative differences for determining anomalies. That is an anomaly may also be detected when a phrase occurs fewer times in the examination interval than in the reference interval.

An embodiment will now be described with respect to FIG. 10 and the flow chart of FIG. 11, where a phrase tree is constructed, and one or more phrases from this phrase tree are compared between the examination interval and the reference interval. In this example the phrase (or combination of data) is a sequence or string of words.

Figure 10:
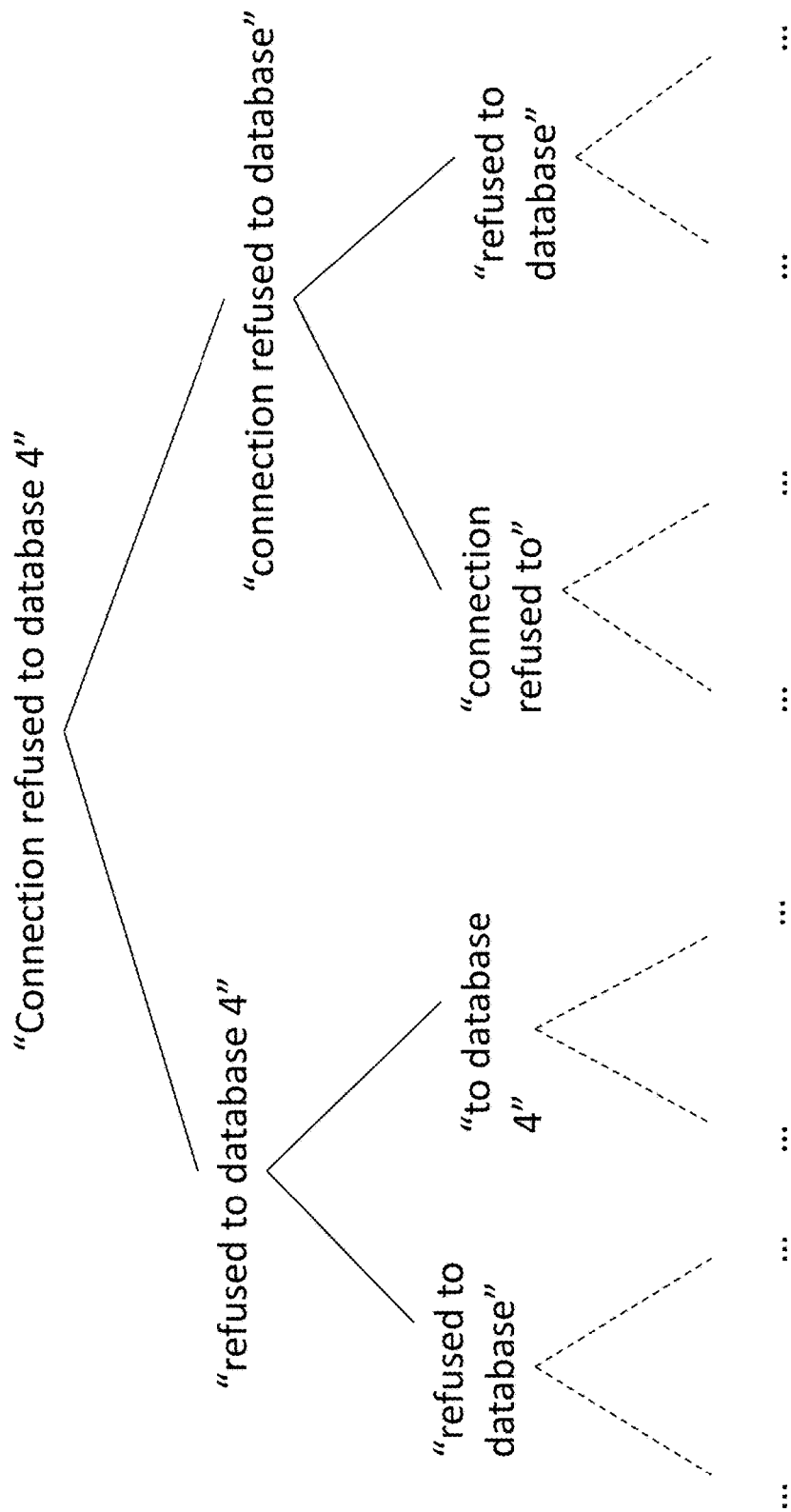
FIG. 10 shows a phrase being broken down, according to an embodiment.
Figure 11:
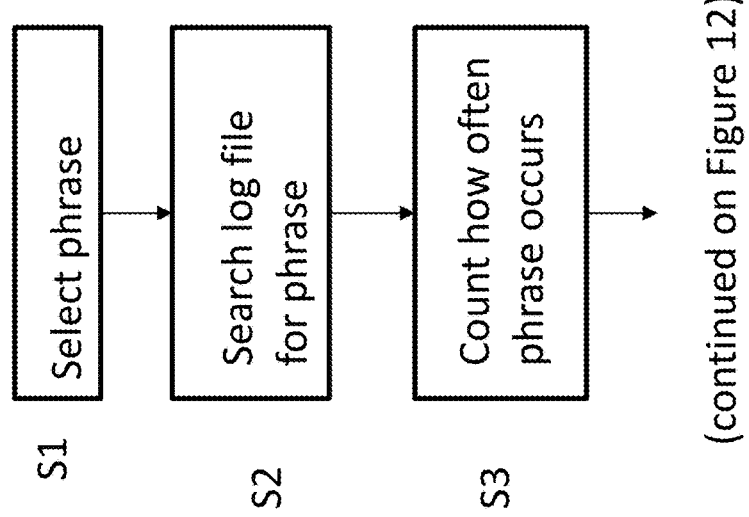
FIGS. 11 and 12 are flow charts of a method according to an embodiment.

As shown at step S1 of FIG. 11, a phrase is selected. In this embodiment the phrase is selected from a log file of the examination interval. In another embodiment the phrase is selected from a log file of the reference interval. As shown in FIG. 10, and for the purposes of example only, the phrase is "connection refused to database 4". For example, and as mentioned above, the examination interval may be a 30 minute period. In some embodiments the selected phrase is selected from a particular segment of the examination interval log file (e.g. a particular line and column). The selected line and/or column may be pre-determined e.g. the "event" column in the first line of the log file. Alternatively the selected portion of the log file may be selected in some other pre-determined fashion or at random.

At step S2, the examination log file is searched for this phrase.

At step S3 a count is made of how often that phrase occurs in the examination log file.

At step S4 (see FIG. 12) the hash table for the examination interval is updated. The phrase may occur any number of times in the examination interval (e.g. 1, 2, 3. . . n occurrences) The phrase may not occur at all in the examination interval, in which case the hash table will show 0 (zero) occurrences of that phrase.

Optional step S4a is explained in more detail later.

The phrase is then broken down in to one or more selected sub-phrase(s) as previously described, as shown at step S5. For example, and as shown in FIG. 10, the phrase is broken down in to a first sub-phrase "refused to database 4" and a second sub-phrase "connection refused to database". That is in the first sub-phrase the first word (or term) has been removed from the original phrase, and in the second sub-phrase the last word (or term) has been removed from the original phrase.

At step S6 a count is conducted for one or more of the sub-phrase(s) in the examination interval. This may be carried out one sub-phrase at a time e.g. process the phrase "refused to database 4" first, then process "connection refused to database". The hash table is updated accordingly.

The sub-phrases can then be broken down in to further sub-phrases. For example, as shown in FIG. 10 the sub-phrase "refused to database 4" is broken down to "refused to database" and "to database 4". The sub-phrase "connection refused to database" is broken down to "connection refused to" and "refused to database". These phrases can then be processed in a similar manner, and the hash table updated accordingly.

At step S7 the process is ended for that phrase and any of its associated sub-phrases. In one embodiment the process for a given phrase is ended when that phrase and all of its associated sub-phrases have been exhausted (a variation of this embodiment is discussed further below with respect to optional step S4a).

Then, the process can begin again for a different portion (e.g. phrase) of the log file. This can be continued according to pre-determined criteria. By way of non-limiting example the process can continue for any one or more of: a set time-period; until a certain number of phrases in the log-file (examination and/or reference) have been processed; until all phrases in the log file (examination and/or reference) have been processed; until a certain number of anomalies have been detected. The overall process for the examination interval can be considered completed once the pre-determined criteria has been satisfied.

According to some embodiments, the process for a particular phrase is ended when a "mapping" is found for that phrase in a given interval (reference or examination). That is if the phrase "connection refused to database 4" is found to be present in the interval in question (i.e. a count of 1 or more), then the hash table(s) is/are updated to reflect this, and processing for that phrase is ended i.e. that phrase is not broken down any further in to any sub-phrases. Therefore referring back to FIGS. 11 and 12 steps S5 and S6 may be skipped if a count of one or more is found for a phrase in question. Therefore if the hash table is updated at step S4 to show that there is one or more instances in the log file of the phrase or sub-phrase being analysed at that point, then the determination at step S4a is "yes", and the process jumps to step S7 where the process is ended for that phrase or sub-phrase. In other words in such embodiments the algorithm tries to find the longest phrase(s) present in the log file without exhausting all possible sub-phrases. This approach may provide suitable results for the type of information that is stored in system log files, without having to perform excessive or time-consuming processing.

If on the other hand the count for the phrase or sub-phrase in question is zero, then the determination at step S4a is "No", and the process continues to step S5.

The process can be completed for the reference interval in the same manner or a similar manner used for the examination interval.

In embodiments the hash table for the reference interval may be generated at a different time to the hash table for the examination interval. For example the hash table for the reference interval may be pre-prepared and then stored in memory. The reference hash table can then be retrieved from memory as required and compared with a hash table for an examination interval. The memory can store a plurality of hash tables for a plurality of respective reference intervals. A hash table for a reference interval can then be chosen which most closely matches system conditions during the examination interval, for comparison. The hash tables for one or more examination intervals can also be stored in memory, once compiled. In some embodiments there may be a time difference between when the hash table is prepared for a given examination interval and when it is compared with the hash table for the respective reference interval. For example the system may store the hash table data and then perform the comparison at another time, for example at a set time of day. Once the hash tables have been completed (and/or retrieved from memory) for the examination interval and the reference interval then they can be compared so that any anomalies can be detected. However, as explained above the comparing step does not necessarily immediately follow on from the step of compiling the hash table in question.

An overview of the process of generating hash tables is explained with reference to FIG. 13.

Figure 12:
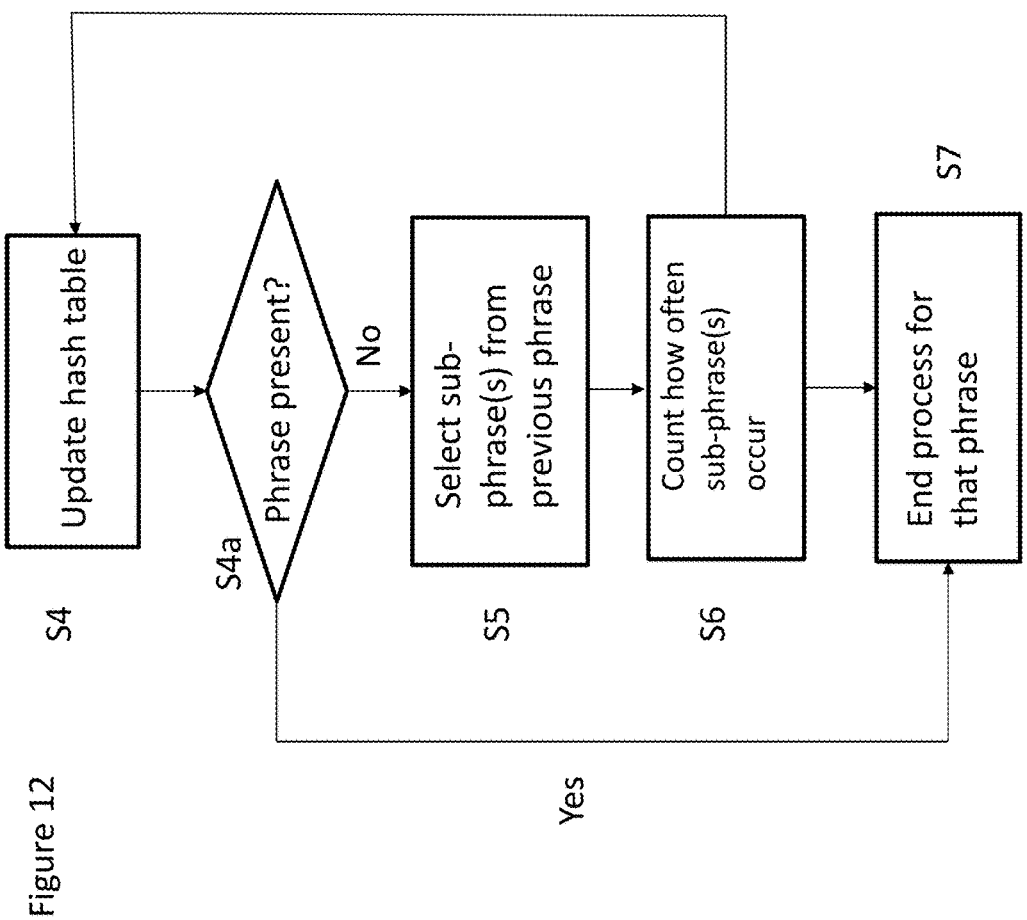

At step S1 a hash table is generated for the examination interval, in a manner as described in FIGS. 11 and 12.

At step S2 a hash table is generated for the reference interval, in a manner as described in FIGS. 11 and 12.

At step S3 the hash tables are compared.

At step S4 any anomalies are identified. For example if there is a variance (which may comprise a threshold variance) in a count of a particular phrase between the examination interval hash table and the reference interval hash table, then it may be determined that there is an anomaly.

Figure 13:
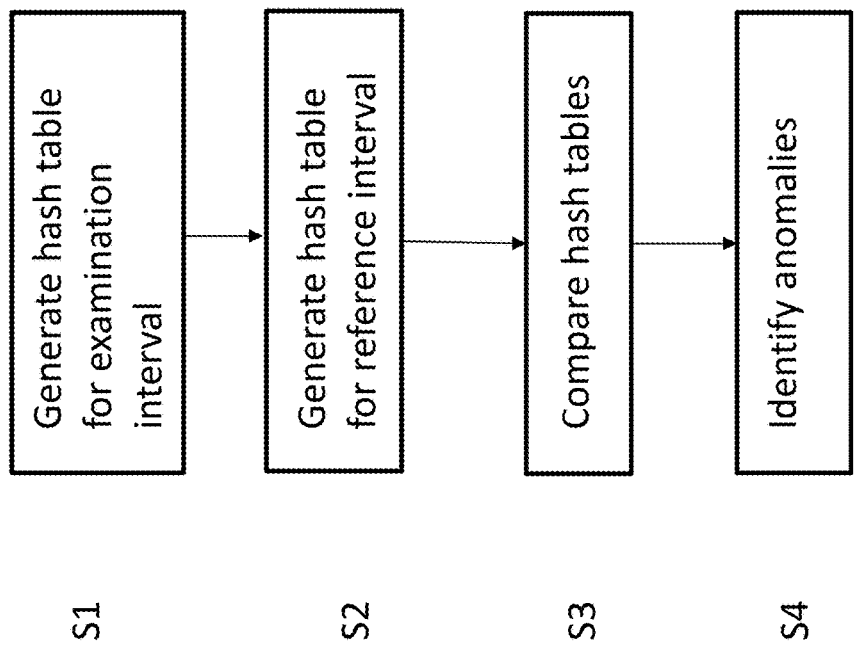
FIG. 13 is a flow chart of a method according to an embodiment.

The order of the steps of FIG. 13 can be varied. For example the hash table for the reference interval or examination interval could be prepared before the hash table for the other of the reference interval and examination interval. The hash table for the reference interval and/or examination interval may be pre-stored and retrievable from a memory for comparison thereof. Alternatively the hash tables may be prepared in parallel.

In some embodiments, where a mapping is found at a particular level of a phrase tree in question, then the process may be ended for that entire tree and not just the branch of the tree where the mapping was found. For example, if a mapping for the phrase "refused to database 4" is found (see the second row of FIG. 10), then any further breaking down of the phrase "connection refused to database" on the other branch of the tree is also ended.

In other embodiments the branches can be considered individually, such that ending the process on one branch does not necessarily cause processing to be ended on a different branch.

Therefore in embodiments the granularity of the procedure can be varied, in as much as the extent to which phrases are sub-divided can be varied. The required granularity can be on a case-by-case basis, or can be pre-defined.

In some cases, the same phrase may occur on different branches of the same tree. For example, on row 3 of the tree of FIG. 10, the phrase "refused to database" occurs on two separate branches. Where this happens, in some embodiments counts for that phrase on the two separate branches can be added together to provide a total count for that phrase, to be inserted in the hash table.

As previously discussed, the selected phrase may be selected from a line of the examination log file. This is explained in more detail in FIG. 14, which shows an exemplary log file 1300. In this example the log file 1300 is a log file of an examination interval, although it could equally be that of a reference interval. The log file 1300 comprises a "row" column 1301, a "date" column 1302, a "time" column 1304, a "user I.D." column 1306, and an "event" column 1308. The event in row 1 is "Connection refused to database 4". As per FIGS. 10 to 12, analysis of the log file may be begun using this phrase. In some embodiments, processing of the selected phrase takes place on a line by line basis through the log file. That is lines 2, 3, 4 . . . n of the log file will in turn be checked to see if this phrase occurs in those lines, and the hash table updated accordingly. In embodiments the first phrase chosen for analysis does not have to be taken from the first row of the log file. Any row can be chosen as a starting point. Furthermore, although phrases can be chosen for analysis on a row by row basis, any other order (or random order) can be used.

In some embodiments the searching of the log file for a phrase excludes the row or portion of the log file from which the phrase being analysed originates. This avoids the phrase counting itself as a match. In some embodiments, searching begins in a row or portion subsequent to a row or portion from which the phrase being analysed originates. Using FIG. 14 as an example, the phrase "Connection refused to database 4" originates in row 1, and therefore searching begins in row 2. In the example of FIG. 14, this phrase does not appear elsewhere in the examination interval. Although not shown, for the purposes of explanation it will be considered that the log file does not contain this phrase either. In some embodiments a phrase that originates from a certain field in the log file is only processed with respect to other phrases in that field. For example, if phrase "Connection refused to database 4" from the "Event" column is chosen for analysis, then only the Event column will be searched for other instances of this phrase. In other embodiments there may be cross-field analysis.

The phrase is then broken down to sub-phrases as shown in FIG. 10. The sub-phrase "connection refused to database" occurs in row 6 of the log file 1300. Accordingly this phrase can be added to the hash table(s), with a count of 1 for the examination interval.

Since a mapping for this sub-phrase has been found, then processing for this line is ended. Processing of row 2 can then begin, and so on.

The log file of the reference interval can then be analysed in a similar manner.

Therefore in embodiments the log files of the examination interval and the reference interval are separately analysed, so that separate hash tables are constructed for the examination interval and reference interval. The separate hash tables are then compared to identify anomalies.

The log files and/or hash tables of the examination interval and reference interval may differ.

Once completed, the hash tables can be manipulated. For example phrases that have a count of zero can be removed, and/or the results can be sorted so that phrases or sub-phrases with the highest occurrence are at the top. Furthermore, the results of the hash tables can be combined to provide a further hash table showing the differences between the occurrences of phrases between the two intervals, as shown for example in FIG. 8. This table can also be sorted so that phrases with the biggest difference are at the top. Therefore the most frequently occurring anomalies will be at the top of the table. In embodiments the system can then deal with each anomaly in order of importance.

The splitting up of phrases in to sub-phrases can help the system and/or engineers to quickly ascertain the types of errors/anomalies that are occurring in the system. For example, as described with respect to FIG. 14, there is no matching result for the phrase "connection refused to database 4" in either the reference interval or the examination interval i.e. the count is zero in both tables, so the difference is also zero. However, a match was found in the examination interval for the phrase "connection refused to database", with no corresponding phrase in the reference interval. Therefore a difference between the reference interval and the examination interval can be determined, which can be flagged up as an anomaly. Therefore it may be determined from this that there is generally a problem with connecting to the database in the examination interval, and therefore the system and/or engineers can work to solve this problem. If on the other hand there had been a large difference in the count for the phrase "connection refused to database 4" between the examination and reference intervals, then the system and/or engineers would know more specifically to attempt to solve problems associated with database 4.

In some embodiments results in the hash table are weighted according to external factors, such as differing amounts of traffic during the reference interval and the examination interval, so as to enable detection of anomalous behaviour even when the reference interval does not match the expected behaviour of the examination interval. For example, if phrase x occurs five times in the reference interval and ten times in the examination interval, but there is twice the amount of traffic in the examination interval, then it could be inferred that the phrase occurs a same or similar amount of times with regard to the level of traffic and/or per user in both intervals and may not indicate an anomaly.

As described in the embodiments, a mapping between phrases and occurrence counts can be used to identify anomalies. However, the mapping may also be considered to be between phrases and lists of numerical starting positions in the log files where the phrases occurred. Referring to FIG. 8 for example the examination interval count for "A, B, C" is "3". Additionally and/or alternatively to this count there may be provided a "position identifier" column in the table of FIG. 8 which identifies where in the examination interval log file these instances occurred. For example such a column may provide information such as "row 10, row 76, row 93". The number of positions contained in the list can provide the number of occurrences of the phrase that are used to detect and/or find anomalies. After anomalies have been detected the positions in the log files provided in the list can be used to quickly find rows in the log file that contained the phrase, to present contextual data about the anomalies to the system or a user. For example a particular row where an anomaly occurred may provide further useful information to the system or an operator regarding that anomaly. In other words further information associated with an anomaly in a log file may be determined based on recorded position identifiers.

One example of a table which may be used in some embodiments is given below.

| Phrase | Position identifier |
|---|---|
| Database 4 | Row 6 |
| Failure | Row 58 |
| Database 4 | Row 72 |
| ... | ... |

Another example of a table which may be used in some embodiments is given below.

| Phrase | Position identifier |
|---|---|
| Database 4 | Row 6, Row 72 |
| Failure | Row 58 |
| ... | ... |

Figure 15:
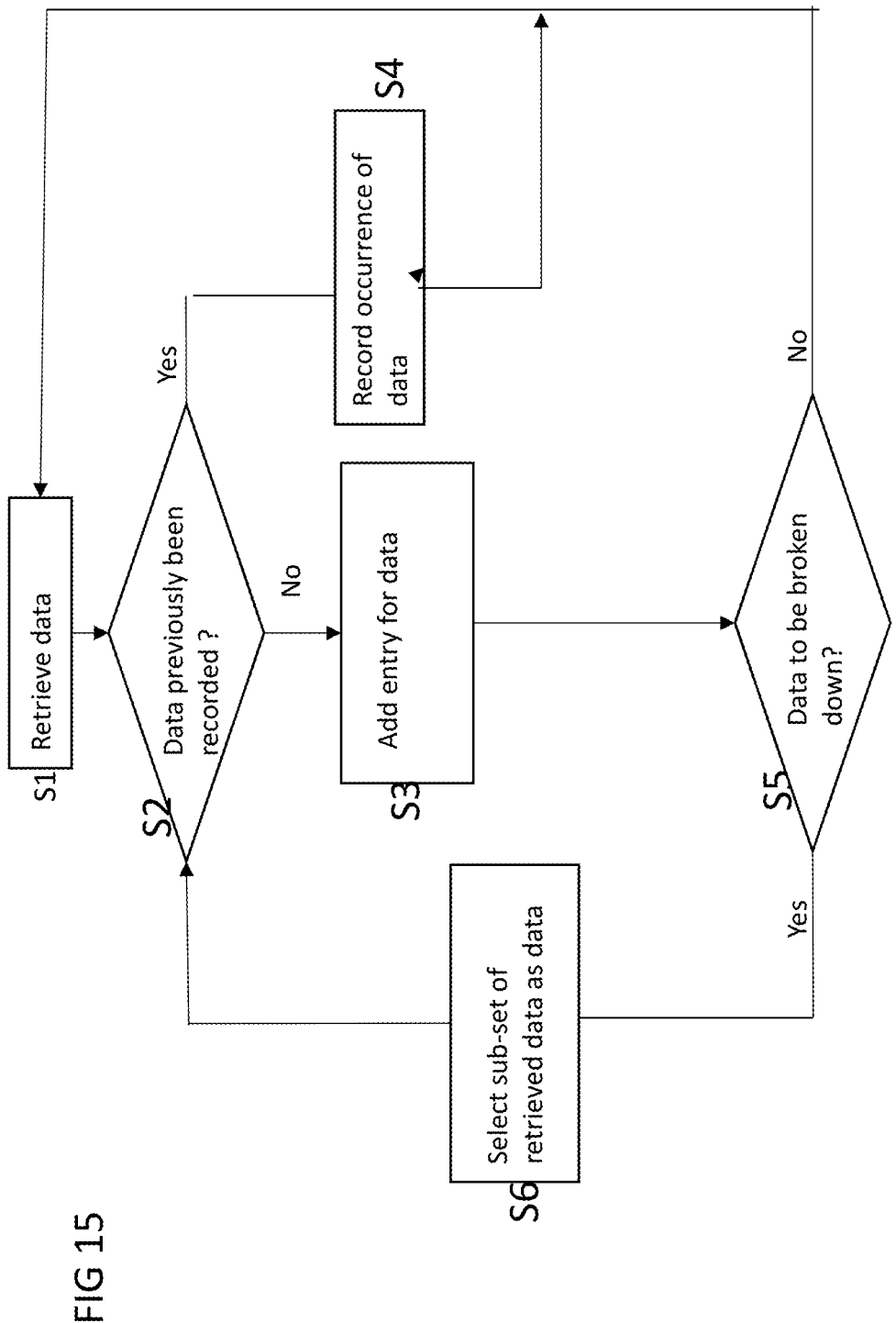
FIG. 15 shows a flow chart of another method according to an embodiment.

Reference is made to FIG. 15 which shows a modification to the method described previously. In step S1, data is retrieved. In this example the data may be a log file entry, a phrase, a set of data or the like.

In step S2, a check is made to see if the retrieved data has occurred previously. If so the next step is step S4 in which a record is made of the occurrence of the retrieved data is made. As discussed previously, this may comprise updating count information associated with the retrieved data and/or providing information about the location of the retrieved data or any other suitable way of recording the occurrence of the retrieved data.

The next step will then be step S1 again to retrieve the next data. In an alternative embodiment, the method may alternatively loop to step S5 where the data which has previously occurred is also broken down.

If in step S2, it is determined that the retrieved data has not occurred previously, the next step will be step S3. In step S3, an entry for the retrieved data is made so that if that data is subsequently retrieved, a match will result for that subsequent data. This may also comprises providing count information for that retrieved data (e.g. count 1) and/or providing information about the location of the retrieved data or any other suitable way of recording the occurrence of the retrieved data.

In step S5, a determination will be made as to whether to look at part of the data. In some embodiments, it may be determined that the retrieved data can only be broken down a maximum of n times where n is an integer or the data has to be larger than a certain size to be broken down. The retrieved data may comprise one or more delimiters. The data may be broken down at one or more positions defined by the delimiters. There may be a requirement that data between delimiters is not broken down. In some embodiments there may be a minimum number of delimiters required where the minimum number is an integer or zero. In the previous example, the words in a phrase may be separated by delimiters in the form of spaces or any other suitable delimiter.

If it is determined that the retrieved data is not to be broken down (or further broken down), then the next step is step S1, and the next data is retrieved. This may be repeated until all the data in a first set of data has been retrieved and processed.

If it determined that the retrieved data is to be broken down, then the next step is step S6 when the retrieved data is broken into one or more subset. This may use any of the techniques previously mentioned and may for example comprise one or more phrases. The method will loop back to step S2. The subset of data is treated in exactly the same way as the retrieved data, in some embodiments.

In some embodiments, data is retrieved. Then it is determined if the data has occurred previously. If so, then the occurrence is recorded. This may be achieved by incrementing a count, recording the position in a table or the like. If not, then an entry is added for that data and the occurrence recorded. In some embodiments, the entire log file is not checked for further occurrences of that data at that point but instead the next data is retrieved. In other embodiments, when new data is entered, the log file or the like may be checked for other occurrences of that data.

In some embodiments, the determination that if that data has occurred previously may comprise verifying whether there is any entry for that data in a data store or in a table as described earlier.

When an anomaly is determined, an output may be provided, indicative of this. The output may be a visual output which is displayed to a user on a display. Alternatively or additionally, the output may be a control output to control the use of one or more computer programs or portions thereof.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer implemented method, implemented in a device comprising at least one processor configured to process data to provide frequency information and at least one memory, for determining one or more anomalies associated with a first set of data, said method comprising:

processing, by the processor, said first set of data to provide respective frequency information for each of a plurality of combinations of data in said first set of data, said frequency information comprising a number of times each respective combination of data occurs in said first set of data, wherein said first set of data comprises a plurality of data entries, and wherein a combination of data comprises a combination of data elements forming at lest part of a data entry in the set of data;

comparing said frequency information for the first set of data with frequency information for said combinations of data in a reference set of data, said reference set of data comprising data of a reference interval; and in dependence on said comparison determining one or more given combinations are anomalies based on a difference in frequency information of said given combination for said first set of data and said reference set of data.

2. A method according to claim 1, wherein at least one of said combinations of data comprises n data elements, where n is an integer greater than one.

3. A method according to claim 1, wherein providing frequency information for a respective combination of data comprises maintaining a count of a respective occurrence of said particular combination of data.

4. A method according to claim 3, wherein maintaining a count of a respective occurrence of said respective combination of data comprises providing position information indicating a position of a respective occurrence of respective combination of data in the first set of data.

5. A method according to claim 4, wherein a plurality of combinations of data is stored as separate entries in a first table field of a table, the table comprising a second field for recording the respective position information associated with the respective plurality of combinations of data.

6. A method according to claim 4, wherein further information associated with an anomaly in the first set of data is determined based on said position information.

7. A method according to claim 1, comprising providing a least one subset of at least one combination of data of said plurality of combinations of data to provide a further combination of data, and processing said further combination of data to provide respective frequency information.

8. A method according to claim 1, comprising for a given combination of data, determining if said given combination of data is comprised in said first set of data and if not, processing said given combination to provide at least one further combination of data, the at least one further combination of data being a subset of said given combination of data and determining if the at least one further combination of data is comprised in said first set of data.

9. A method according to a claim 8, further comprising, if said given combination of data is not comprised in said first set of data, maintaining a count of a respective occurrence of said given combination of data.

10. A method according to claim 1, comprising for a given combination of data, determining if said given combination of data is comprised in said first set of data and if so, providing associated frequency information and selecting another combination of data to determine if said another combination of data is comprised in said first set of data.

11. A method according to claim 1, wherein a given combination is identified as an anomaly when it is detected that the frequency information of a given combination in the first set of data differs from the frequency information of the given combination in the reference set of data by more than a threshold amount.

12. A method according to claim 1, wherein at least one of the first and reference set of data is provided by one or more log files.

13. A method according to claim 1, wherein the frequency information is stored in one or more hash tables.

14. A method according to claim 1, wherein said combination of data comprises a subset of data elements of the data entry, the method comprising processing said subset of data elements to provide respective frequency information for the subset of data elements.

15. A non-transitory computer readable medium comprising computer executable instructions which when run by at least one processor configured to process data to provide frequency information are configured to determine one or more anomalies associated with a first set of data by:

processing said first set of data to provide respective frequency information for a plurality of combinations of data in said first set of data, said frequency information comprising a number of times each respective combination of data occurs in said first set of data, wherein said first set of data comprises a plurality of data entries, and wherein a combination of data comprises a combination of data elements forming at least part of a data entry in the set of data;

comparing said frequency information for the first set of data with frequency information for said combinations of data in a reference set of data, said reference set of data comprising data of a reference interval; and in dependence on said comparison determining one or more given combinations of data area anomalies based on a difference in frequency information of said given combination for said first set of data and said reference set of data.

16. An apparatus comprising:

at least one memory and at least one processor, the at least one memory and the at least one processor configured to cause the apparatus to:

process a first set of data to provide respective frequency information for a plurality of combinations of data in said first set of data, said frequency information comprising a number of times each respective combination of data occurs in said first set of data, wherein said first set of data comprises a plurality of data entries, and wherein a combination of data comprises a combination of data elements forming at least part of a data entry in the set of data;

compare said frequency information for the first set of data with frequency information for said combinations of data in a reference set of data, said reference set of data comprising data of a reference interval; and in dependence on said comparison, determine one or more given combinations are anomalies based on a difference in frequency information of said given combination for said first set of data and said reference set of data.

* * * * *